Sept. 17, 1940. P. KOLLSMAN 2,215,448
PRESSURE RESPONSIVE INSTRUMENT
Filed May 6, 1933 2 Sheets-Sheet 1

INVENTOR
Paul Kollsman

Sept. 17, 1940.   P. KOLLSMAN   2,215,448
PRESSURE RESPONSIVE INSTRUMENT
Filed May 6, 1938   2 Sheets-Sheet 2

INVENTOR
Paul Kollsman

Patented Sept. 17, 1940

2,215,448

UNITED STATES PATENT OFFICE 2,215,448

PRESSURE RESPONSIVE INSTRUMENT

Paul Kollsman, New York, N. Y., assignor, by mesne assignments, to Square D Company, Detroit, Mich., a corporation of Michigan Application May 6, 1938, Serial No. 206,402

3 Claims. (Cl. 264—1)

This invention relates to improvements in pressure responsive instruments, more particularly to improvements in instruments responsive to the rate of a pressure change. Instruments of the latter kind are known in the aircraft field as rate of climb or vertical speed indicators.

In pressure responsive instruments, and rate of pressure change responsive instruments in particular, it was observed that instruments show a considerable error if subject to changes in temperature caused by a one-sided or local heating of the instrument, a temperature error which cannot be compensated for by means of the usual temperature responsive element included in the mechanism of the instrument.

It is accordingly an object of this invention to provide an improved instrument in which the operating mechanism is temperature insulated.

Rate of pressure change responsive instruments usually operate on the principle of measuring the differential pressure between a point subject to changes in pressure and an enclosed volume of gas or air communicating with said point through a constricted passage. In order to maintain low the temperature error caused by changes in temperature of the enclosed air or gas volume, it has become customary to enclose the said air or gas volume within a chamber formed partly or entirely of a vacuum bottle.

According to this invention, I propose to enclose the operating mechanism of a rate of pressure change instrument within the same vacuum bottle containing the volume of air from which one pressure for the measurement is derived. This novel arrangement, besides providing a temperature protection for the operating mechanism of the instrument, serves a further purpose: as the volume of the operating parts of a rate of pressure change responsive instrument is relatively small but requires considerable space, it is possible by the novel arrangement considerably to increase the magnitude of the enclosed gas or air volume by making the vacuum bottle large enough also to include the operating mechanism.

It is thus a further object of this invention to provide a rate of pressure change instrument having a greater accuracy by using a greater volume of enclosed air or gas without enlarging the overall dimensions of the instrument. This advantage is of particular importance for vertical speed indicators for aircraft where great accuracy combined with small dimensions of the instrument are required.

Further aims, objects and advantages of this invention will appear from a consideration of the description and the accompanying drawings showing for purely illustrative purposes embodiments of this invention. It is to be understood, however, that the description is not to be taken in a limiting sense, the scope of this invention being defined in the appended claims.

Referring to the drawings.

Figure 1:
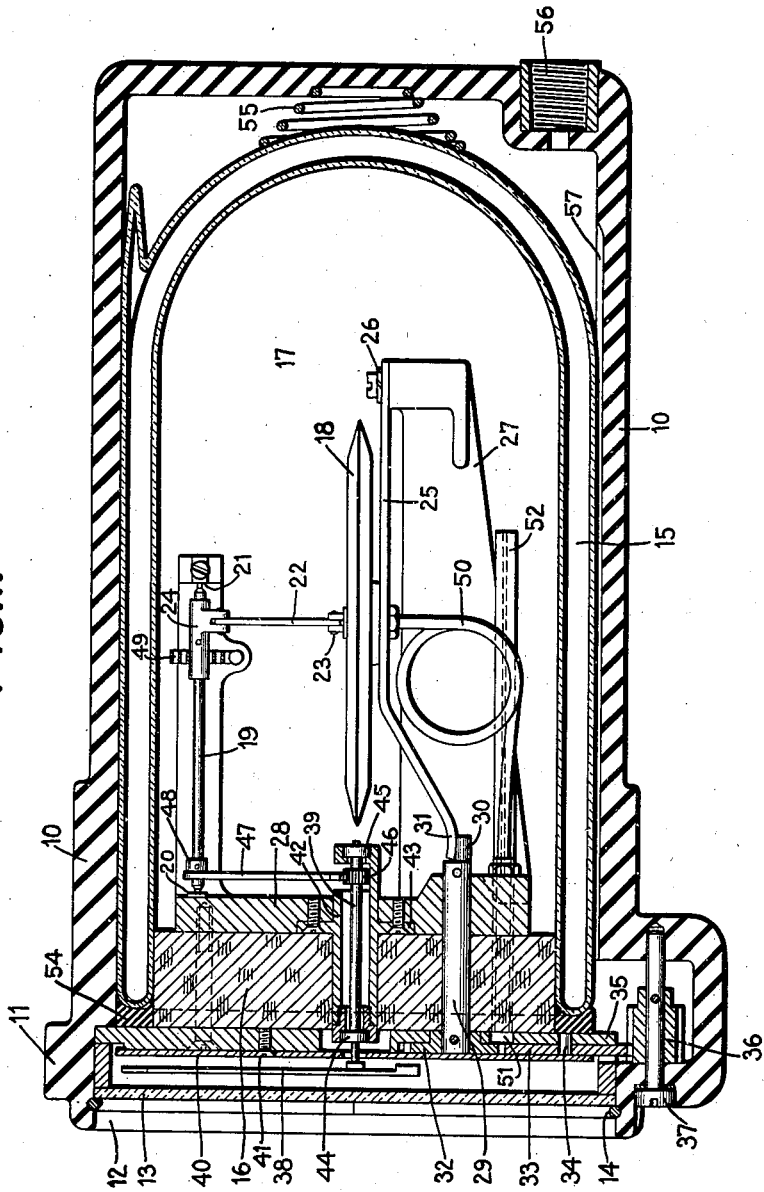
Figure 1 is a sectional enlargement of a vertical speed indicator for aircraft.

In instrument casing 10 having a mounting flange 11 is provided with an aperture 12 closed by a window 13 held in place by means of a snap ring 14. A vacuum bottle 15 closed by means of a stopper 16 suitably of compressed cork or similar temperature insulating material provides a pressure chamber 17.

Inside the pressure chamber a pressure responsive element shown in the illustrated example as being a diaphragm capsule 18 is provided, actuating a rotatable shaft 19 mounted in bearings 20 and 21 by means of a link 22 pivotally connected to the capsule at 23 and a crank member 24 secured to the shaft 19.

For purposes of zero adjustment the diaphragm capsule is preferably adjustable mounted with respect to the actuating mechanism operated thereby. In the illustrated embodiment the capsule 18 is mounted on a cantilever member 25, mounted at 26 to a support 27, the support being positioned with its base plate 28 at the inside of the stopper 16. A shaft 29, having an eccentric portion 30, is rotatably mounted in the base plate 28 and tightly fitted in the stopper 16 to prevent pressure leakage. The eccentric portion engages the free arm 31 of the cantilever member 25, thereby permitting upon rotation of the shaft 29 a positional adjustment of the capsule 18 relatively to the shaft 19.

For rotating the shaft 29 from the outside, a train of gears is shown comprising a spur gear 32 secured to the shaft 29 meshing with a second gear 33 rotatable about a pivot 34 in a front plate 35. The second gear 33 meshes with a pinion 36 rotatable with its screw-headed shaft 37 in the casing 10.

Indicating means are provided shown in the illustrated embodiment as being a pointer 38 rotatable with its shaft 39 relatively to a dial 40, shown as secured to the front plate 35 by means of screws 41.

The pointer shaft in the illustrated embodiment is supported for rotation in a tubular member 42 having a flange 43 for mounting on the base plate 28 and mounting jewel bearings 44 and 45. The shaft 39 in this embodiment is well fitted in the front bearing 44 as to prevent undue pressure leakage through the bearing while, at the same time, offering a minimum of friction to the shaft. A pinion 46 secured to or integral with the shaft 39 meshes with a toothed segment 47 secured to the shaft 19 at 48. For the purpose of imparting a bias to the capsule 18 or for removing lost motion in the operating mechanism a spiral spring may be employed in the conventional manner as indicated in the drawings at 49.

The interior of the diaphragm capsule 18 is connected through a conduit 50 to the interior space of the casing outside the vacuum bottle 15, the conduit 50 terminating at 51. The interior of the bottle 17 is connected with the space inside the casing 10 through a constricted passage in the illustrated embodiment shown as being capillary tube 52 located inside the vacuum bottle to assume the temperature prevailing therein and terminating at 53.

In order to obtain a tight sealing of the space 17 from the interior of the casing 10, a rubber gasket 54 may be provided in addition against which the bottle 15 is firmly held by means of a compression spring 55 between the bottle and the bottom of the casing.

The operation of the device is as follows: Upon a change in pressure inside the casing 10 the relatively small volume of air or gas inside the diaphragm capsule 18 will instantaneously assume the changed pressure value by virtue of its connection through the conduit 50. The relatively large volume enclosed within the vacuum bottle 17 follows the pressure change only very slowly on account of the resistance offered by the constricted conduit 52 to a flow of gas or air flowing therethrough. Accordingly a pressure differential is created acting on the diaphragm capsule which causes the pointer to be deflected a certain amount. Obviously if the change in pressure is sudden and great, the deflection of the pointer will be great in response to a relatively great differential pressure acting on the diaphragm capsule. If, on the other hand, the pressure inside the casing 10 changes very slowly, the corresponding flow of air or gas through the constricted conduit will be small and the pressure differential acting on the diaphragm capsule will be small. This results in a small deflection of the pointer.

For determining the change in pressure at a distant point, for example at the outside of an airplane, a pressure line may be connected to the casing 10 which is shown as having a threaded bushing 56 for connection of a pressure line thereto. A groove 57 in the wall of the casing may be provided as a low resistance passage between the pipe connection 56 and the front part of the casing in which the conduits 50 and 52 terminate.

In the illustrated embodiment a relatively small leakage occurs through the pointer bearing 44. As this leakage is small but of constant magnitude it can easily be taken into consideration when designing the calibration of the dial. In effect, the leakage at the bearing 44 acts like a second constricted conduit connecting the interior space of the vacuum bottle with the interior of the casing.

Figure 3:
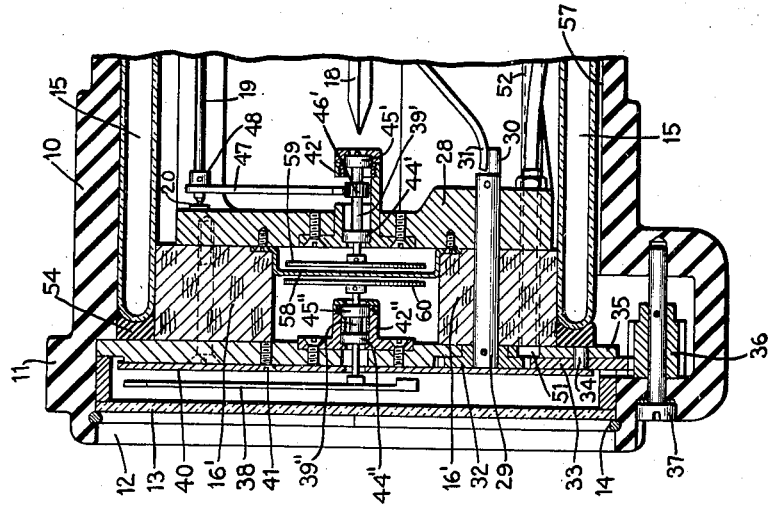
Figure 3 shows in part a modified form of the instrument shown in Figure 1.
Figure 2:
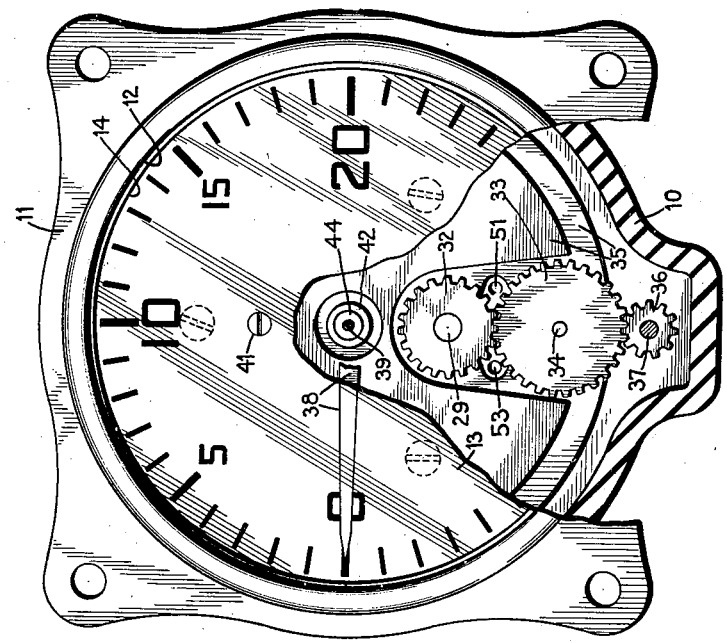
Figure 2 is a front view partly in section of the instrument shown in Figure 1.

Figure 3 shows a modified form of the invention in which any leakage at the pointer shaft is prevented. The vacuum bottle 15 is sealed by means of a stopper 16' preferably of compressed cork or the like having a thin walled portion 58 preferably of thin metal or molded material thus providing a tight closure of the space inside the bottle. The segment 47 on the shaft 19 meshes with a pinion 46' secured to or integral with a shaft 39' mounted in bearings 44' and 45' in a tubular member 42'. Concentric with the shaft 39' a pointer shaft 39'' is provided carrying the pointer 38 and rotable in bearings 44'' and 45'' in a tubular member 42''. The two shafts 39' and 39'' are connected for joint angular motion by means of magnetic elements 59 and 60 secured to the respective shafts. When the shaft 39' and the element 59 are rotated the shaft 39'' and the member 60 will repeat this movement by virtue of the magnetic coupling of the elements 59 and 60.

Obviously the present invention is not restricted to the particular embodiments herein shown and described. Moreover, it is not indispensable that all the features of this invention be used conjointly since they may advantageously be employed in various combinations and subcombinations.

What is claimed is:

1. A rate of pressure change responsive instrument comprising, in combination, an instrument casing; a transparent window fitted into said casing; a dial visible through said window; a pointer movable relatively to said dial; a vacuum bottle inside said casing; a stopper sealing the inside of said bottle from the inside of said casing and supporting said dial at the one side; a support mounted on the other side of said stopper and inside the space of said bottle; a diaphragm capsule carried by said support; a conduit passing through said stopper and connecting the inside of said capsule with the inside of said casing; a capillary tube passing through said stopper and connecting the inside of said bottle with the inside of said casing; a tubular bearing member passing through said stopper; a pointer shaft and a pinion integral therewith mounted in said bearing member said shaft supporting said pointer; a toothed sector pivotally mounted on said support to mesh with said pinion; a link connecting said capsule and sector for actuation of said sector in response to movements of said capsule; and means for connecting the inside of said casing to a source of pressure the rate of change of which is to be determined.

2. A rate of pressure change responsive instrument comprising, in combination, an instrument casing; a transparent window fitted into said casing; a dial visible through said window; a pointer movable relatively to said dial; a vacuum bottle inside said casing; a stopper sealing the inside of said bottle from the inside of said casing and supporting said dial at the one side; a support mounted on the other side of said stopper and inside the space of said bottle; a diaphragm capsule; a cantilever spring supporting said diaphragm and mounted on said support; a shaft rotatable from the outside passing through said stopper and having an eccentric portion bearing against the free arm of the cantilever spring, thereby permitting positional adjustment of said capsule; a conduit passing through said stopper and connecting the inside of said capsule with the inside of said casing; a capillary tube passing through said stopper and connecting the inside of said bottle with the inside of said casing; a tubular bearing member passing through said stopper; a pointer shaft and a pinion integral therewith mounted in said bearing member said shaft supporting said pointer; a toothed sector pivotally mounted on said support to mesh with said pinion; a link connection connecting said capsule and sector for actuation of said sector in response to movements of said capsule; and means for connecting the inside of said casing to a source of pressure the rate of change of which is to be determined.

3. A pressure change responsive instrument comprising, in combination, a substantially cylindrical instrument casing; a supporting member insertable into said casing; a diaphragm capsule and a motion amplifying mechanism connected to said capsule mounted to one side of said supporting member; a temperature insulating vessel air tightly sealed against and supported by said supporting member to form an air chamber therewith enclosing said capsule and mechanism; indicating means mounted to the other side of said support; a motion transmitting means for actuating said indicating means from said mechanism through said support; and means providing a constricted passage through said support to connect said chamber with the surrounding atmosphere, whereby said supporting member, diaphragm, mechanism, vessel and indicating means form a unit insertable into and removable from said instrument casing.

PAUL KOLLSMAN.